United States Patent [19]
Tsuchihashi et al.

[11] Patent Number: 5,823,285
[45] Date of Patent: Oct. 20, 1998

[54] FOUR WHEEL DRIVE WORKING VEHICLE

[75] Inventors: Hironori Tsuchihashi; Yoshikazu Togoshi; Osami Fujiwara; Teruo Shimamura; Akio Matsui; Hideya Umemoto; Kenichi Chujo; Niro Bando, all of Sakai, Japan

[73] Assignee: Kubota Corporation, Osaka, Japan

[21] Appl. No.: 625,060

[22] Filed: Mar. 29, 1996

[30] Foreign Application Priority Data

| Apr. 6, 1995 | [JP] | Japan | 7-081066 |
| Aug. 31, 1995 | [JP] | Japan | 7-223869 |
| Aug. 31, 1995 | [JP] | Japan | 7-223870 |

[51] Int. Cl.⁶ .............................................. B60K 17/356
[52] U.S. Cl. ........................... 180/242; 180/247; 180/312
[58] Field of Search ................................... 180/242, 243, 180/311, 312, 247

[56] References Cited

U.S. PATENT DOCUMENTS

| 4,262,768 | 4/1981 | Itatani et al. | 180/242 |
| 4,886,142 | 12/1989 | Yamaoka et al. | 180/242 |
| 5,277,270 | 1/1994 | Hasegawa | 180/312 |
| 5,560,447 | 10/1996 | Ishii et al. | 180/242 |

FOREIGN PATENT DOCUMENTS

61-27366  6/1986  Japan.

*Primary Examiner*—Daniel G. DePumpo
*Attorney, Agent, or Firm*—Jordan and Hamburg

[57] ABSTRACT

A four wheel drive working vehicle having a hydraulic block for covering one side of a propelling transmission case, an engine, and an HST attached to a side of the hydraulic block remote from the transmission case. The HST includes an input shaft for transmitting drive from the engine, and an output shaft extending through the hydraulic block for transmitting the drive to a transmission line in the transmission case. The vehicle further includes a drive transmission mechanism for selectively transmitting the drive from the transmission line to rear wheels, and a transmission shaft for transmitting the drive between the drive transmission mechanism and the transmission line in the transmission case. The drive transmission mechanism is attached to the side of the hydraulic block where the HST is attached. The transmission shaft extends through the hydraulic block.

11 Claims, 11 Drawing Sheets

FOUR WHEEL DRIVE WORKING VEHICLE

BACKGROUND OF THE INVENTION

1. Field of the Invention

The present invention relates to a working vehicle, in particular a four wheel drive working vehicle having a hydrostatic stepless transmission for propelling the vehicle, and transmission lines for transmitting drive to front and rear wheels.

2. Description of the Related Art

The Japanese patent application laid open under No. Sho. 61-27366 discloses an agricultural tractor as one example of working vehicles having a propelling hydrostatic stepless transmission. This tractor has an engine disposed in a front region thereof, in which drive is transmitted from the engine to the hydrostatic stepless transmission (hereinafter "HST") through a clutch and a transmission shaft. The drive is transmitted from the HST via an output shaft of the HST to an input shaft of a transmission case. A hydraulic block is connected to one side of the transmission case, and the HST is connected to an outer surface of the hydraulic block remote from the transmission case. The hydraulic block includes a plurality of oil lines communicating with pressure oil in the transmission case. In the above Japanese publication, the output shaft of the HST is connected to the input shaft of the transmission case adjacent communicating bores of the hydraulic block.

In the working vehicle noted above, the drive is transmitted from the engine through the HST and a transmission line in the transmission case to the front wheels or rear wheels. Drive branched from the transmission line in the transmission case is transmitted to the remaining front wheels or rear wheels. Where the drive branched from the transmission line in the transmission case is transmitted to the front wheels or rear wheels, a transmission mechanism (such as a one-way clutch or a change speed device) may be provided to transmit this drive. In the tractor disclosed in the above publication, it is conceivable to provide such a transmission mechanism in a form projecting from an HST case. Such an arrangement requires an opening, a bracket and connecting elements specially for supporting the transmission mechanism. There is room for improvement in this respect.

SUMMARY OF THE INVENTION

The object of the present invention is to provide a four wheel drive working vehicle having a propelling HST, with a simple arrangement and supporting structure for a transmission mechanism, to eliminate the inconvenience noted above.

The above object is fulfilled, according to the present invention, by the following construction:

A four wheel drive working vehicle having a hydraulic block for covering one side of a propelling transmission case, comprising:

an engine;

an HST attached to a side of the hydraulic block remote from the transmission case, the HST including:
  an input shaft for transmitting drive from the engine; and
  an output shaft extending through the hydraulic block for transmitting the drive to a transmission line in the transmission case;

a drive transmission mechanism for selectively transmitting the drive from the transmission line to rear wheels; and a transmission shaft for transmitting the drive between the drive transmission mechanism and the transmission line in the transmission case;

wherein the drive transmission mechanism is attached to the side of the hydraulic block where the HST is attached, the transmission shaft extending through the hydraulic block.

With the above construction, the transmission mechanism is supported by the hydraulic block of the HST, and the drive branched from the transmission line in the transmission case is transmitted to the transmission mechanism via the transmission shaft extending through the hydraulic block. Thus, there is no need for the transmission case to include an opening, a connecting seat or the like specially for supporting the transmission mechanism.

The drive transmission mechanism may be disposed below the hydraulic block. This results in an increased overall weight of the hydraulic block to produce the effect of absorbing vibration of the HST. With the drive transmission mechanism disposed below the hydraulic block, the entire transmission line may have a lowered center of gravity. This provides a stable construction for the entire transmission line including the HST, transmission case and hydraulic block.

In a preferred embodiment of the invention, a filter is attached to a side of the transmission case where the HST is attached. The hydraulic block may define an oil passage for communicating pressure oil in the filter to the HST. According to this construction, with the filter attached to the same side of the hydraulic block where the HST is attached, there is no need for a bracket or connecting elements specially for attaching the filter. This results in a simplified construction of the entire transmission line. Further, with the hydraulic block defining the oil passage therein, there is no need for a pipe or connecting elements therefor to be provided outside the transmission line, which contributes toward simplification of the entire transmission line.

The working vehicle may comprise a pair of right and left main frames extending longitudinally of a vehicle body, and a pair of frame members connected to the main frames, respectively, wherein the hydraulic block is connected to the pair of frame members through connecting means. With this construction, components other than the main frames, such as the hydraulic block which is durable, may be utilized as reinforcement for the frame structure of the vehicle body. This feature realizes a relatively strong frame structure without increasing the number of components required for frame reinforcement The pair of frame members may include right and left surfaces opposed to each other across the hydraulic block transversely of the vehicle body, and connecting stays fixed to the right and left surfaces for contacting the hydraulic block longitudinally of the vehicle body. The connecting means may include a plurality of bolts applied transversely and longitudinally of the vehicle body for fixedly connecting the hydraulic block to the frame members. With this construction, since the hydraulic block may be fixed by bolts transversely and longitudinally of the vehicle body, the hydraulic block may be fixed to the frame members more rigidly than where the hydraulic block is fixed either transversely or longitudinally. Consequently, the HST and transmission case fixed longitudinally with the hydraulic block are steadily fixed to the frame members. Vibrations of the HST and transmission case may be absorbed by the frame structure. This feature realizes a stabilized run of the vehicle.

Generally, the HST produces a relatively strong vibration. Where the relatively heavy transmission mechanism is connected to the hydraulic block directly connected to the HST, the entire drive structure formed of the HST, hydraulic block and transmission case has an increased weight and volume. This structure absorbs part of the vibration of the HST. Further, the above-noted frame structure employed absorbs part of the vibration of the HST also. As a result, the driver may be less affected by the vibration of the HST.

Other features and advantages of the present invention will be apparent from the following description of the preferred embodiments taken with reference to the drawings.

DETAILED DESCRIPTION OF THE PREFERRED EMBODIMENTS

Figure 1:
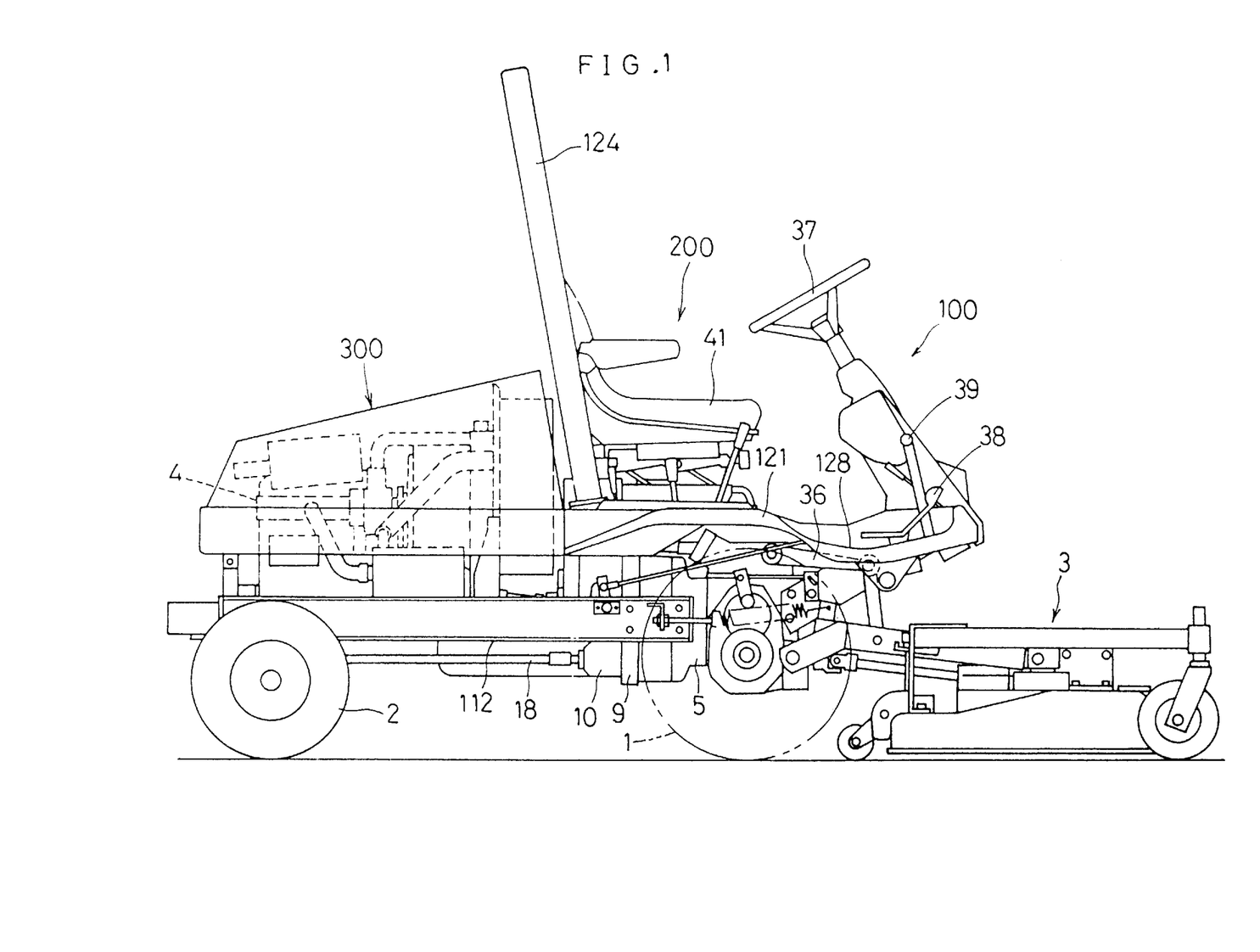
FIG. 1 is a side elevation of a riding lawn tractor.
Figure 2:
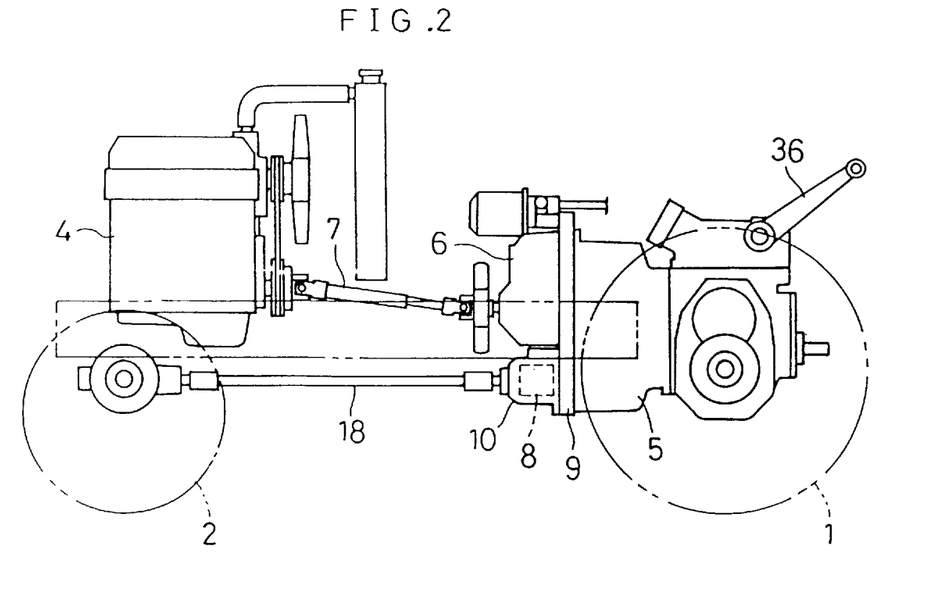
FIG. 2 is a side view showing a transmission system of the riding lawn tractor.

FIG. 1 shows a riding lawn tractor which is one example of four wheel drive working vehicles. This tractor includes a pair of right and left non-dirigible front wheels 1 and a pair of right and left dirigible rear wheels 2 for supporting a tractor body. A mower 3 is connected to a front position of the tractor body to be vertically movable through a lift arm 36. Numeral 100 denotes the tractor body, 200 a driver's section and 300 a motor section. As shown in FIGS. 1 and 2, the tractor body 100 has an engine 4 mounted in a rear region thereof, and a transmission case 5 in a forward region for supporting the front wheels 1. A hydrostatic stepless transmission (hereinafter "HST") 6 is connected to a rear portion of the transmission case 5 through a hydraulic block 9.

With this construction, drive is transmitted from the engine 4 to the HST 6 via a transmission shaft 7. The drive undergoes change speed operations in the HST 6 and transmission case 5 before being transmitted to the front wheels 1. Drive branched off immediately upstream of the front wheels 1 is transmitted to the rear wheels 2 via a two wheel drive-four wheel drive changeover mechanism 8 (corresponding to a transmission mechanism 10) and a transmission shaft 18.

A construction adjacent the transmission case 5 will be described next.

Figure 3:
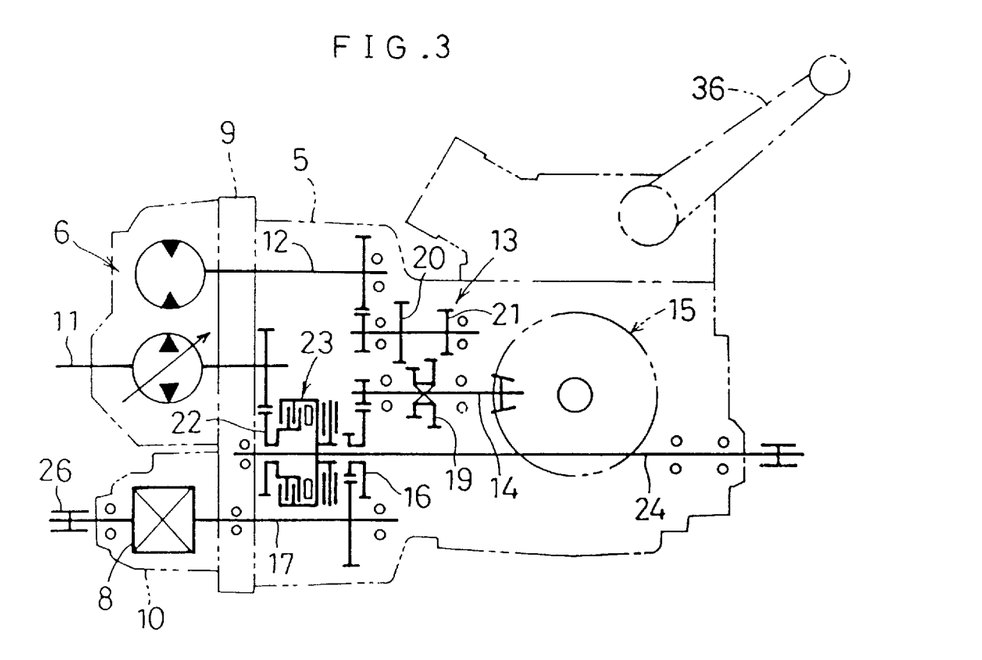
FIG. 3 is a schematic side view of a transmission line in a transmission case.
Figure 4:
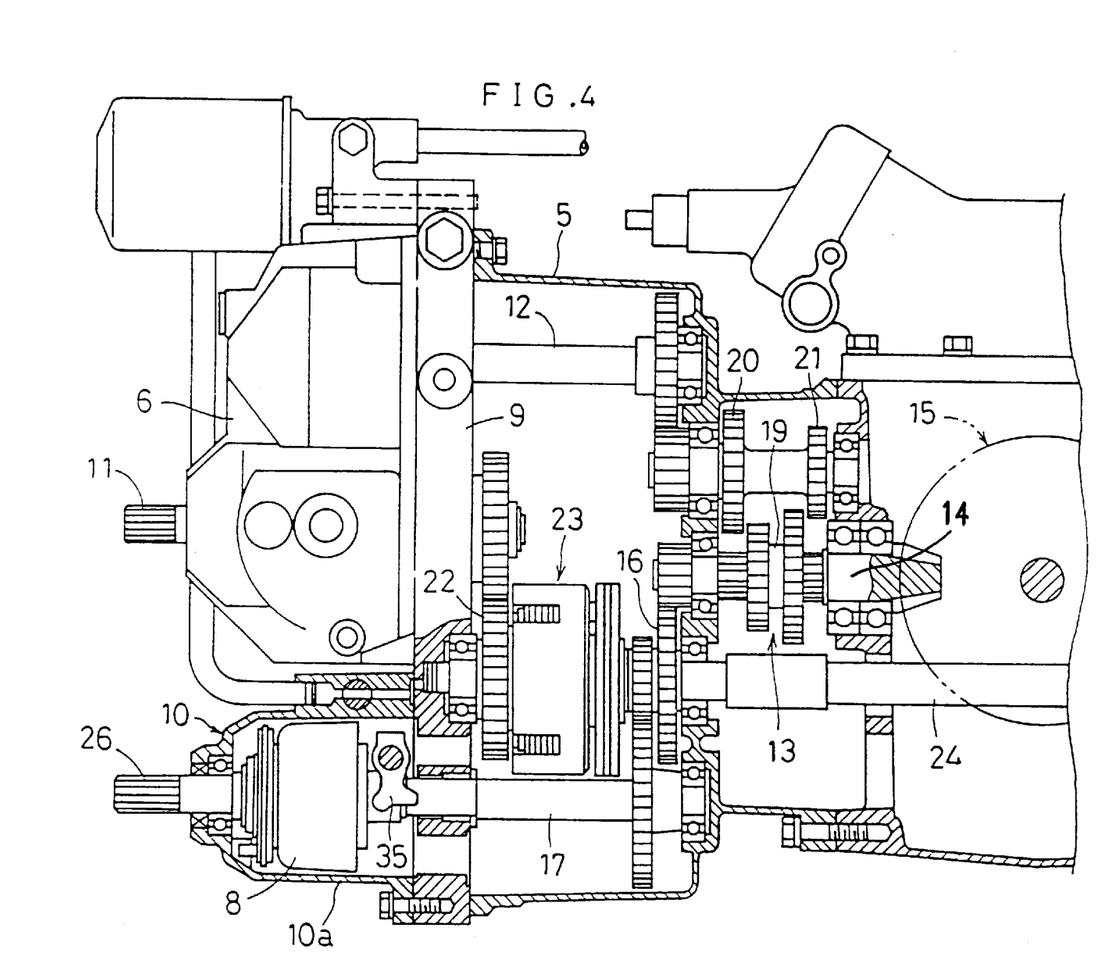
FIG. 4 is a side view in vertical section of the transmission case.

As shown in FIGS. 3 and 4, the hydraulic block 9 of HST 6 is connected to the rear portion of the transmission case 5. HST 6 and a transmission case 10a for driving the rear wheels 2 are connected to a rear wall of the hydraulic block 9. Drive is transmitted from the engine 4 to an input shaft 11 of HST 6 via the transmission shaft 7 (FIG. 2). Then, the drive is transmitted from HST 6 to a differential 15 of the front wheels 1 via an output shaft 12 extending through the hydraulic block 9, and via an auxiliary change speed device 13 and a pinion shaft 14.

The drive is transmitted from the pinion shaft 14 to the two wheel drive-four wheel drive changeover mechanism 8 in the transmission case 10a via a transmission gear 16 (rotatably mounted on a PTO shaft 24 described later) and a transmission shaft 17. Then, the drive is transmitted from an output shaft 26 of the two wheel drive-four wheel drive changeover mechanism 8 to the rear wheels 2 via the transmission shaft 18 shown in FIG. 2. The auxiliary change speed device 13 is a gear type mechanism including a shift gear 19 slidably splined to the pinion shaft 14. This device 13 provides two, high and low, speeds with the shift gear 19 slidable into engagement with a high-speed gear 20 or low speed gear 21.

Drive for powering the mower 3 is transmitted from the input shaft 11 of HST 6 to the PTO shaft 24 through a transmission gear 22 and a PTO clutch 23, and from the PTO shaft 24 to the mower 3 shown in FIG. 1.

Although not shown in FIG. 4, the hydraulic block 9 contains an oil line interconnecting an input-side hydraulic pump and an output-side hydraulic motor in HST 6, and acts as a partition between HST 6 and transmission case 5.

Figure 5:
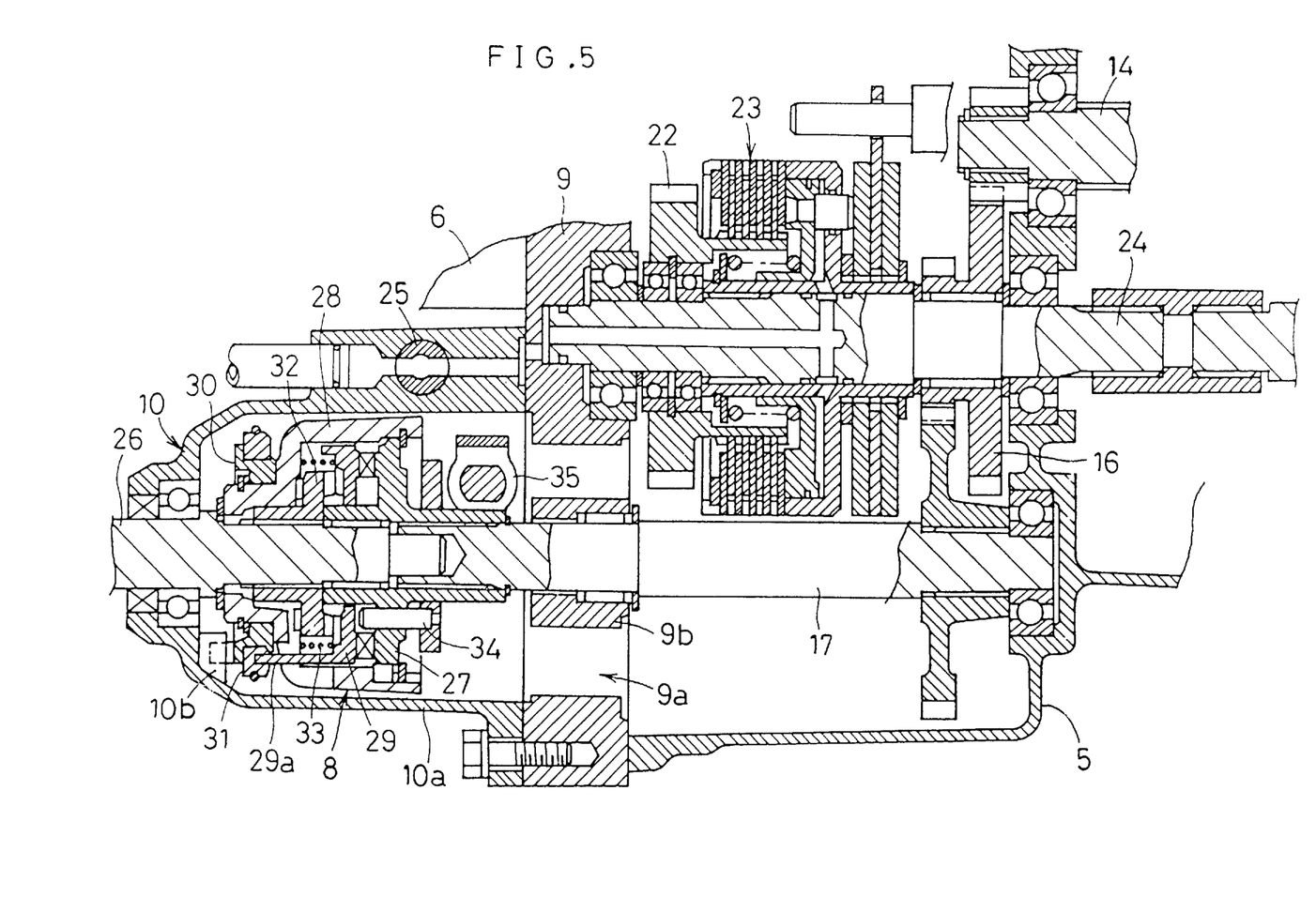
FIG. 5 is a side view in vertical section of a two wheel drive-four wheel drive changeover mechanism and adjacent components.

As shown in FIG. 5, the hydraulic block 9 has a downward extension to which the transmission case 10a is connected, and which supports an end of the PTO shaft 24 through a bearing.

The hydraulic block 9 defines an opening 9a through which an interior of the transmission case 10a communicates with an interior of the transmission case 5 to share lubricating oil. The hydraulic block 9 includes a land 9b through which the transmission shaft 17 extends for support. The transmission case 10a includes a selector valve 25 for engaging and disengaging the PTO clutch 23.

The two wheel drive-four wheel drive changeover mechanism 8 will be described next.

As shown in FIG. 5, the transmission shaft 17 of the transmission case 5 and the output shaft 26 of the two wheel drive-four wheel drive changeover mechanism 8 are supported to be coaxial and rotatable relative to each other. A drive cam 27 having large projections, and a case 28 (rotatable relative to the output shaft 26) are fixed to the transmission shaft 17. A center cam 29 having large projections and small projections arranged back to back is mounted on the drive cam 27 to be rotatable relative thereto within a predetermined angular range. The output shaft 26 has a driven cam 32 fixed thereto and having small projections inside the case 28.

A ring 30 is relatively rotatably mounted on the case 28. The transmission case 10a has a projection 10b formed on an inner surface thereof for engaging and stopping rotation of the ring 30. The center cam 29 includes an arm 29a extending outside the case 28, and an annular brake shoe 31 is fixed to the arm 29a. The brake shoe 31 contacts the ring 30 to apply a light braking force to the center cam 29. A spring 33 is provided for biasing the center cam 29 toward the drive cam 27.

With the above construction, when the transmission shaft 17 drives the drive cam 27 to rotate forward or backward during a straight run (forward or backward run), the center cam 29 rotating forward or backward is pushed leftward in FIG. 5 to engage the driven cam 32 by action of the large projections of the drive cam 27 and center cam 29. As a result, the drive in forward or backward rotation is transmitted from the driven cam 32 to the rear wheels 2.

During turning of the tractor, a difference in turning radii tends to cause the rear wheels 2 to be driven forward or backward faster than the front wheels 1 through contact with the ground. Then, the center cam 29 is pushed back rightward in FIG. 32 to disengage from the driven cam 32 by action of the small projections of the driven cam 32 and center cam 29. This breaks the transmission of the drive in forward or backward rotation to the rear wheels 2.

As shown in FIG. 5, a control rod 34 is supported to be rotatable with the drive cam 27 and slidable along the transmission shaft 17. The control rod 34 is slidable by a control fork 35. When the control fork 35 is operated to slide the control rod 34 leftward in FIG. 5, the control rod 34 forces the center cam 29 into engagement with the driven cam 32. In this state, drive is constantly transmitted to the rear wheels 2 whether the tractor is running straight or making a turn.

Figure 6:
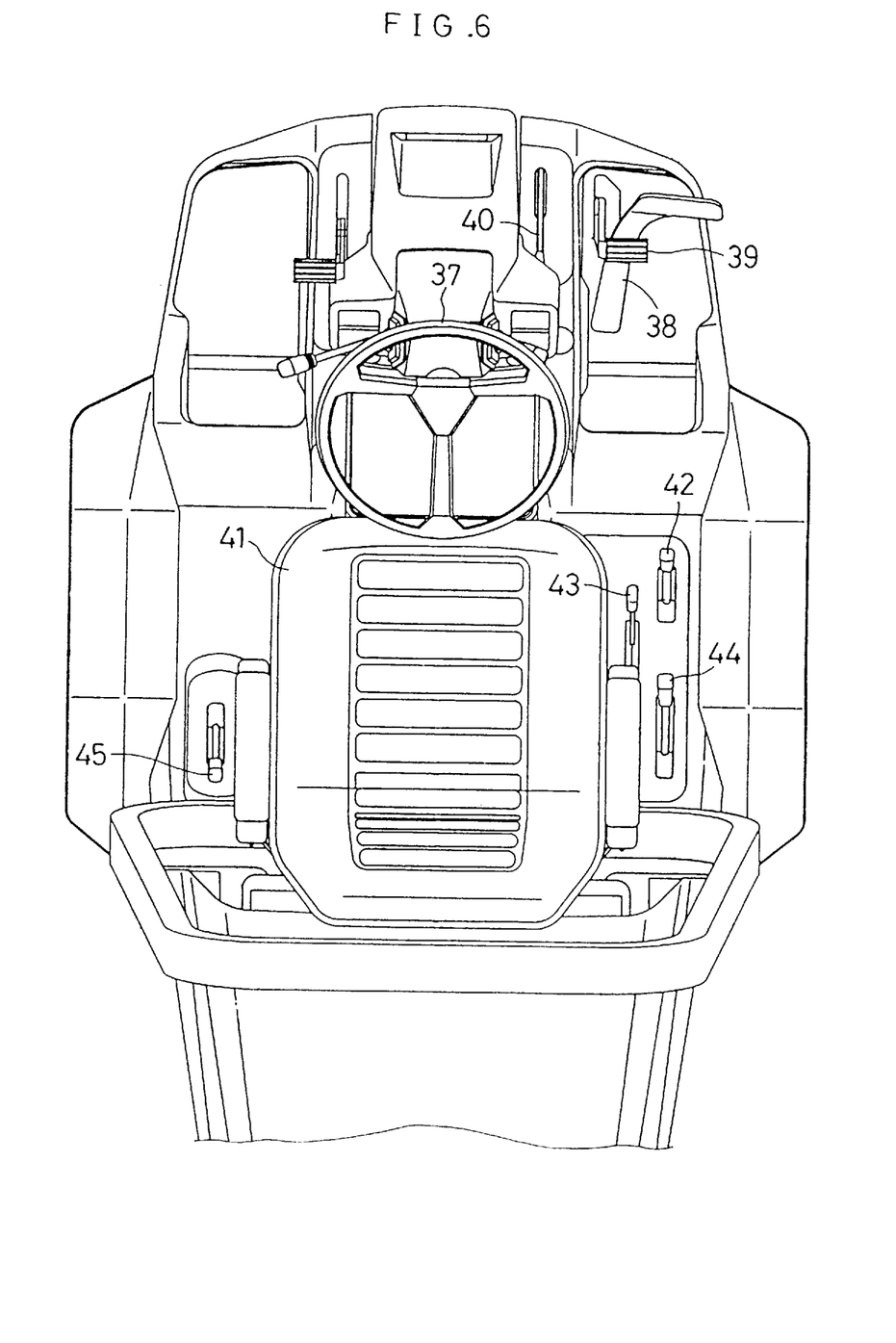
FIG. 6 is a plan view of a driver's section.

As shown in FIG. 6, the driver's section includes, arranged at the right side of a steering wheel 37, a shift pedal 38 for operating HST 6, a brake pedal 39, and a lock pedal 40 for locking the brake pedal 39 to a depressed position (braking position) and unlocking the brake pedal 39 therefrom. Further, arranged at the right side of a driver's seat 41 are a lift lever 42 for operating the lift arm 36 (FIG. 1), an auxiliary shift lever 43 for operating the auxiliary change speed device 13 (FIG. 4), and a PTO lever 44 for operating the selector valve 25 to engage and disengage the PTO clutch 23. A lock lever 45 is disposed at the left side of the driver's seat 41 for operating the control fork 35 shown in FIG. 5, whereby the control rod 34 places the two wheel drive-four wheel drive changeover mechanism 8 in the state to transmit drive constantly to the rear wheels 2.

A hydraulic circuit structure for the riding lawn tractor according to the present invention will be described next.

Figure 7:
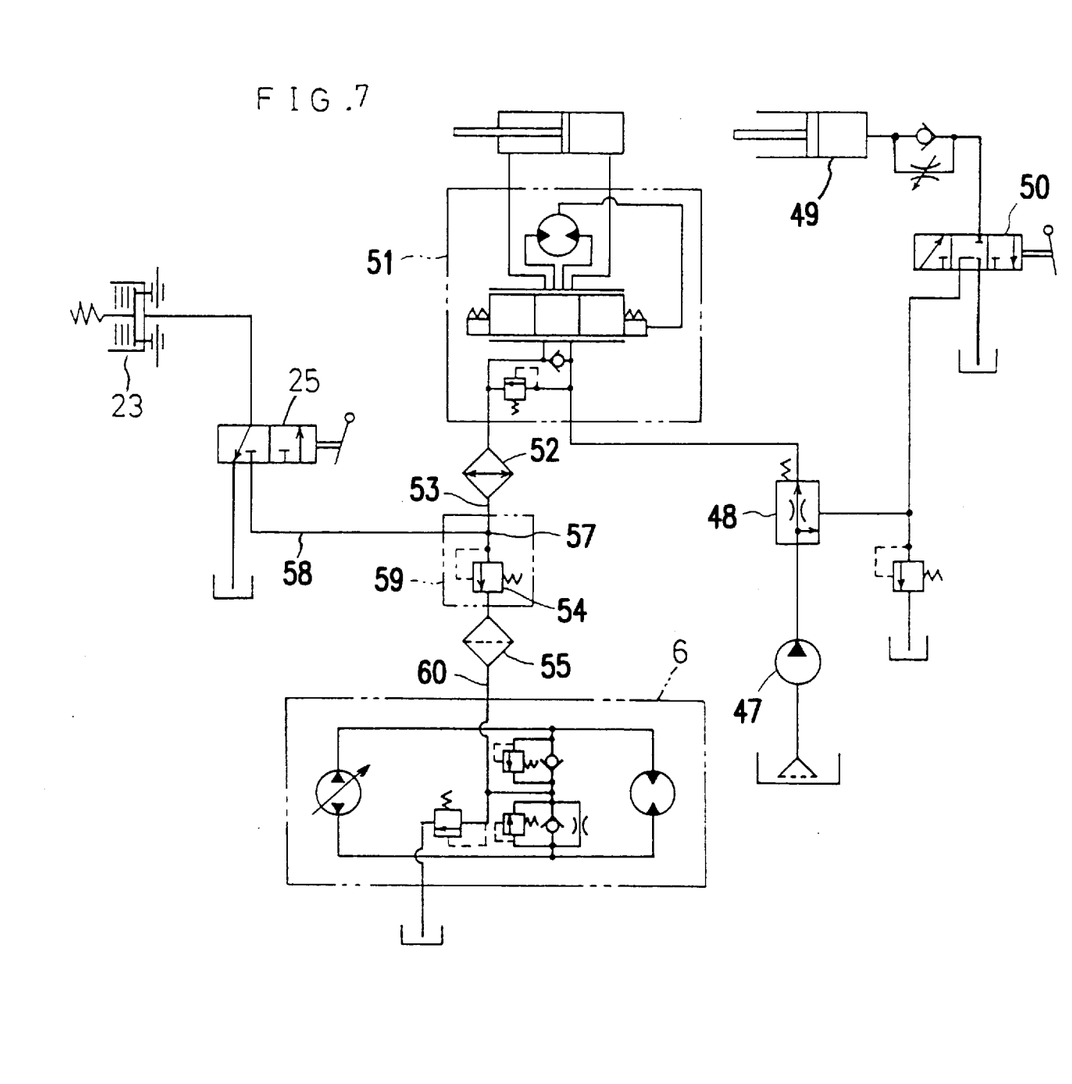
FIG. 7 is a diagram of hydraulic circuitry of the riding lawn tractor.

As shown in FIG. 7, a pump 47 supplies pressure oil through a flow dividing valve 48 to a hydraulic cylinder 49 and a selector valve 50 for swinging the lift arm 36, and to a power steering mechanism 51 for steering the rear wheels 2. Pressure oil discharged from the power steering mechanism 51 is supplied to HST 6 through an oil cooler 52, an outer pipe 53, a junction 57, a switch valve 54 and a filter 55. From the junction 57, the pressure oil flows also through an outer pipe 58 to the selector valve 25 for operating the PTO clutch 23.

Figure 8:
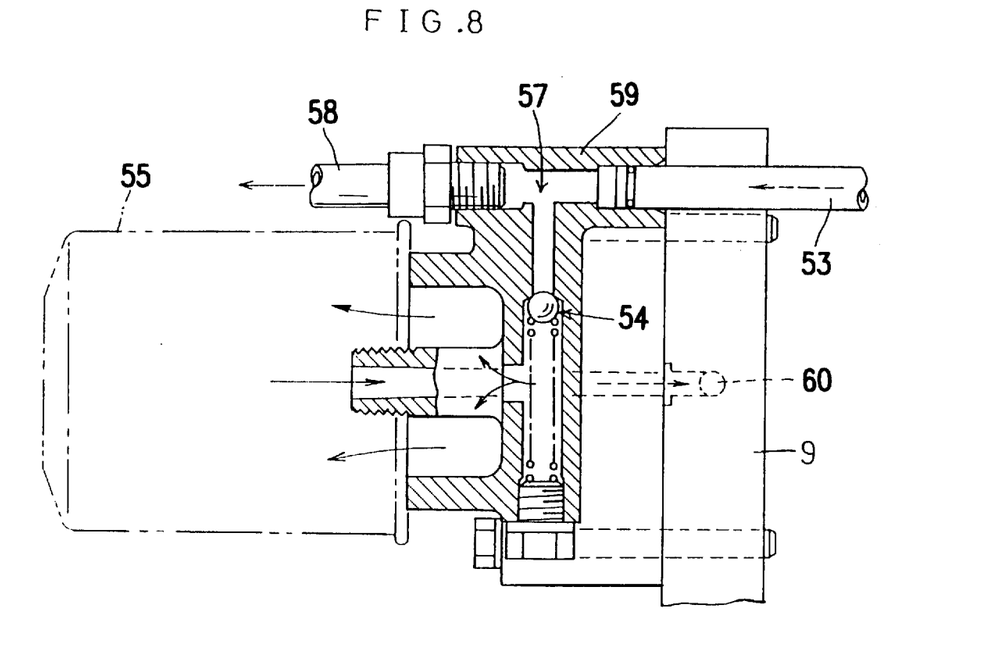
FIG. 8 is a side view, partly in section, of a filter and a valve block.
Figure 9:
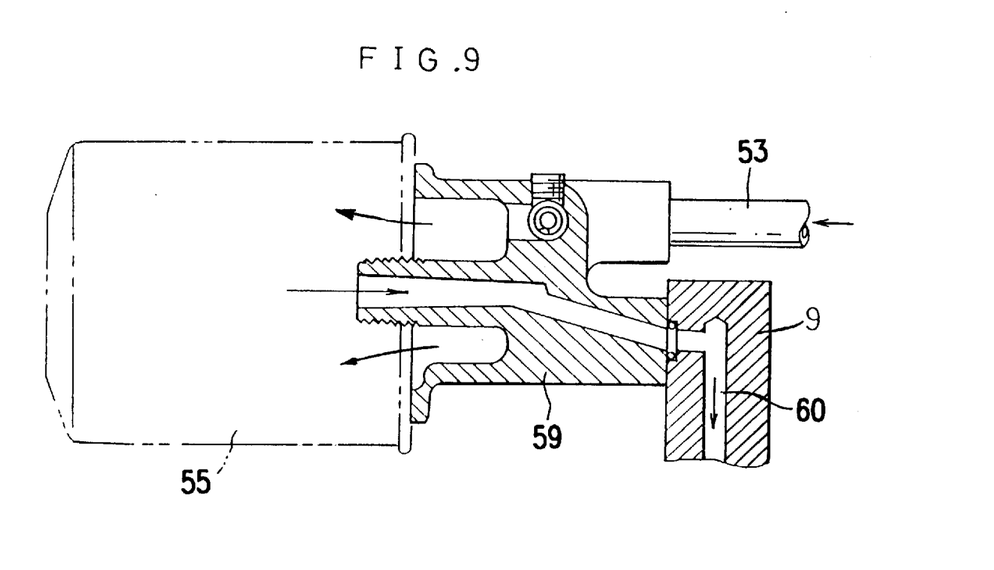
FIG. 9 is a side view, partly in section of the filter and the valve block.
Figure 10:
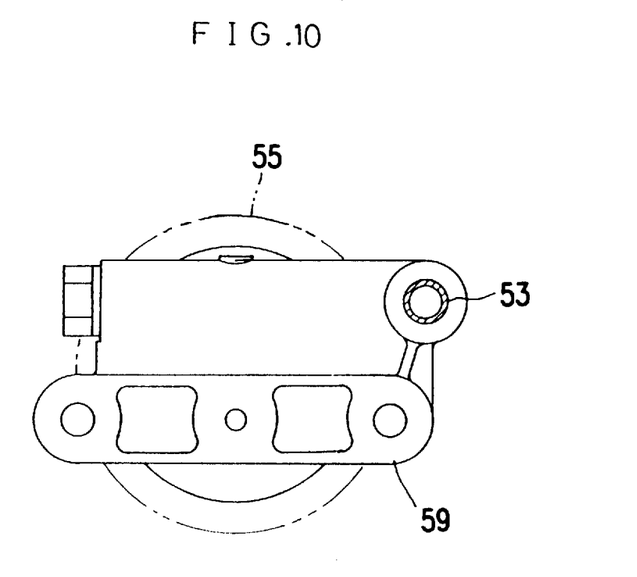
FIG. 10 is a rear view of the filter and the valve block.

As shown in FIGS. 7 and 8, the switch valve 54 is a normally closed valve which opens only when an upstream pressure (from the power steering mechanism 51) reaches a predetermined pressure level. This switch valve 54 and the junction 57 are contained in a single valve block 59. As shown in FIGS. 2, 4, 8, 9 and 10, the valve block 59 is connected to an upper position of the hydraulic block 9, i.e. to the same rear wall thereof where HST 6 is connected. The filter 55 is connected to the valve block 59.

The pressure oil from the pipe 53 is supplied to the filter 55 through the junction 37 and switch valve 34 in the valve block 39. From the filter 35 the pressure oil flows through the valve block 59 again to be supplied to HST 6 via an oil passage 60 formed in the hydraulic block 9.

The above construction does not require the transmission case to define an opening or a connecting seat specially for supporting the filter 55. Further, no pipe or the like is required outside the hydraulic block 9 for connecting the filter 55 to HST 6.

A frame structure for the riding lawn tractor according to the present invention will be described next.

Figure 11:
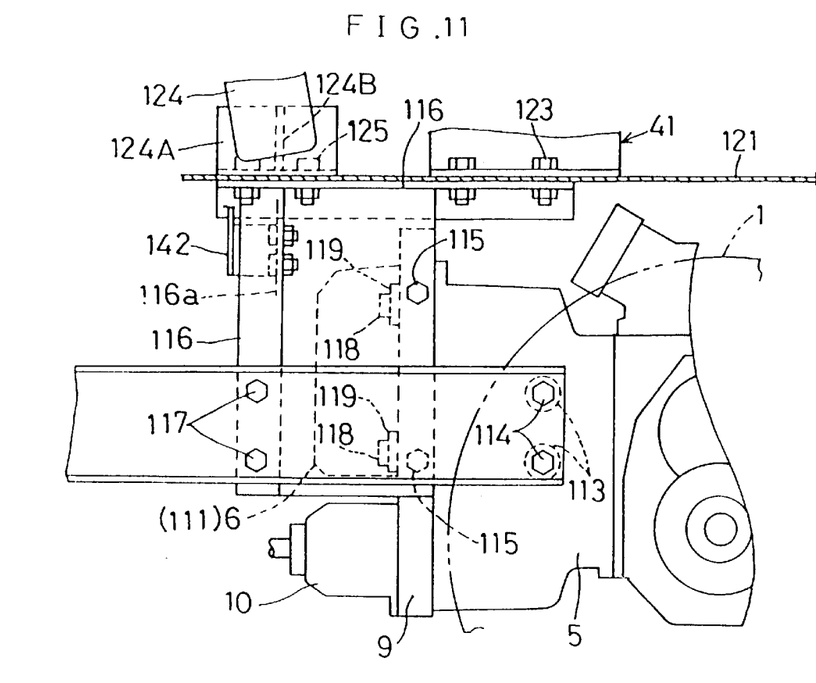
FIG. 11 is a side view showing a principal portion of a connection between the transmission system and a frame structure of the riding lawn tractor.
Figure 12:
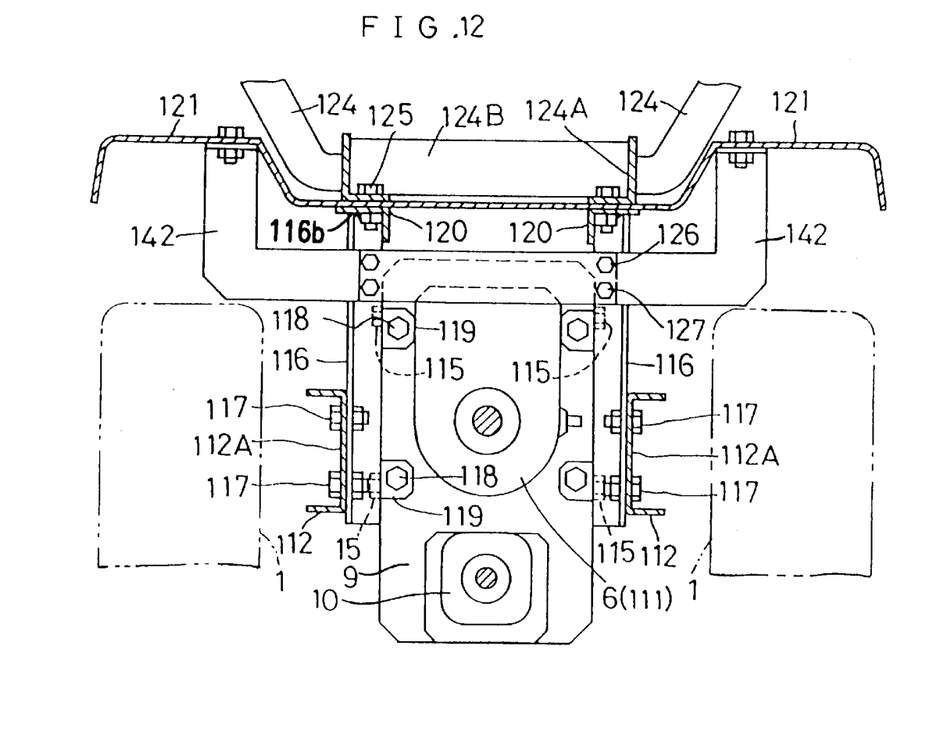
FIG. 12 is a front view showing the principal portion of the connection between the transmission system and the frame structure of the riding lawn tractor.

As shown in FIGS. 1, 11 and 12, the tractor body 100 includes a pair of right and left main frames 112 extending longitudinally thereof. The main frames 112 have forward ends thereof connected, through tubular spacers 113 and by bolts 114, to rear lateral positions of the transmission case 5 disposed in a middle position transversely of the tractor body. As shown in FIG. 12, each main frame 112 is a channel-shaped frame.

Figure 13:
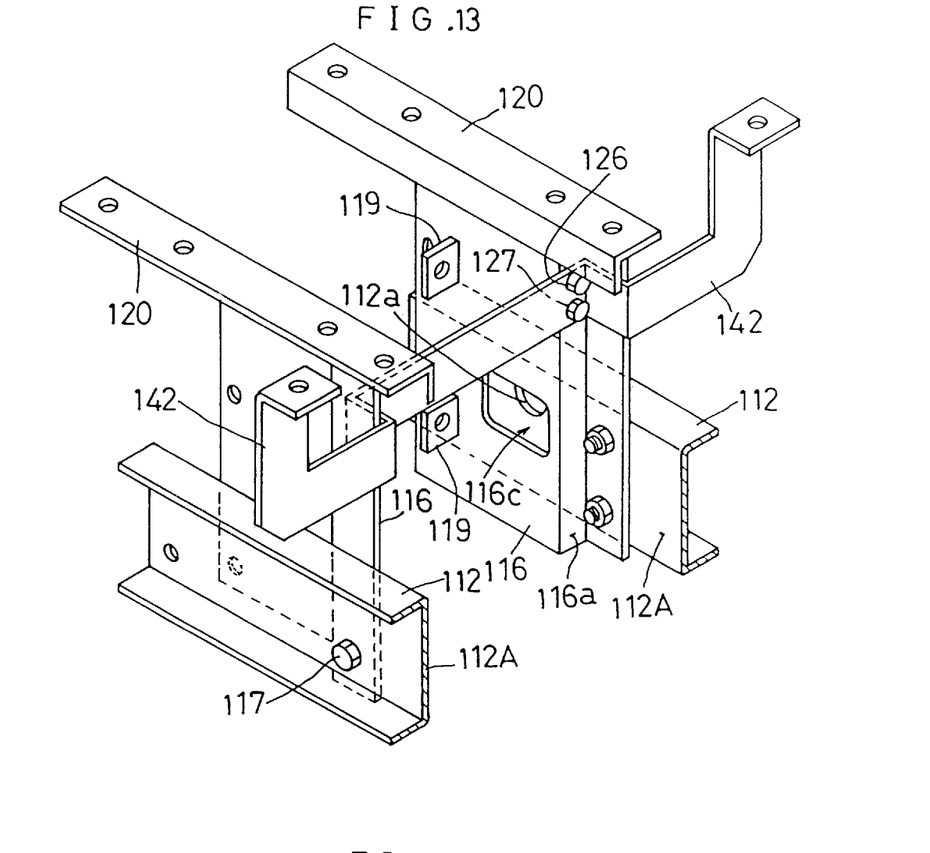
FIG. 13 is a perspective view of the frame structure.

As shown in FIG. 11 through 13, frames 16 are fastened, by bolts 115, to opposite side surfaces of a case 111 containing HST 6. These frames 116 are connected in rear positions thereof to inner surfaces 112A of the main frames 112 by bolts 117 applied from outside the main frames 112.

Each frame 116 has two connecting stays 119 (FIG. 13) welded in a cantilever fashion to upper and lower positions thereof. Each stay 119 is fastened to a lateral end position on the rear wall of the hydraulic block 9 interconnecting the HST case 111 and transmission case 5. The frames 116 are formed of sheet metal, and have portions thereof extending further upward from where the frames 116 are bolted to HST 6 and main frames 112. The frames 116 are bent adjacent the positions thereof bolted to the main frames 112, to define bent portions 116a acting as reinforcements. Each frame 116 includes an upper edge 116b having a support frame 120 welded thereto. The support frame 120 has a downwardly facing L-shape in front view. The support frames 120 extend longitudinally of the tractor body, and have respective forward portions thereof rigidly interconnecting, by means of bolts 123, fenders 121 of the front wheels 1 and the driver's seat 41 in the driver's section 200. Further, the support frames 120 have respective rear positions thereof rigidly interconnecting, by means of bolts 125, right and left proximal ends 124A of an arched rollover protection structure (ROPS) 124 and the fenders 121 of the front wheels 1.

As shown in FIG. 12, the rollover protection structure (ROPS) 124 is formed of an arched square metal pipe having opposite ends thereof welded to the above proximal ends 124A which are L-shaped in front view. A reinforcing plate 124B extends between and is welded to the right and left proximal ends 124A. Further, as shown in FIG. 12, a reinforcing plate 142 is bolted as at 126 and 127 to the bent portions 116a of the frames 116 and the right and left fenders 121.

Figure 14:
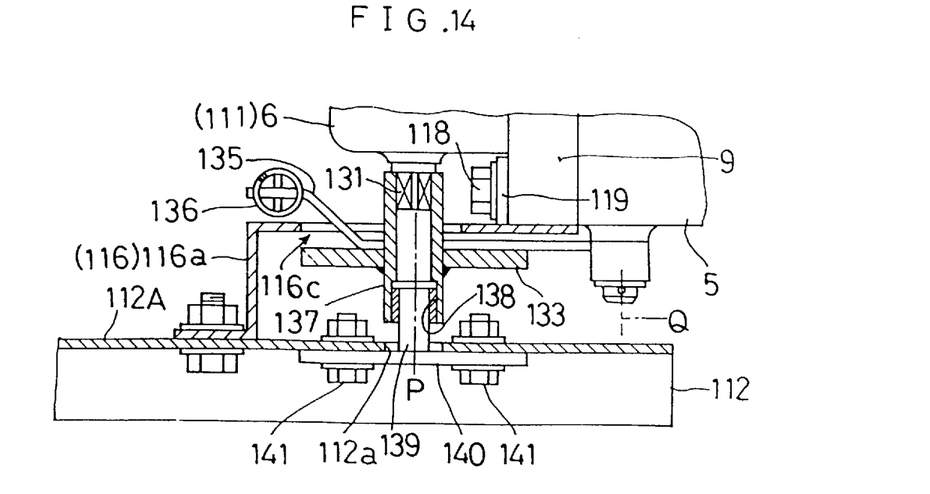
FIG. 14 is a shift controller of an HST.
Figure 15:
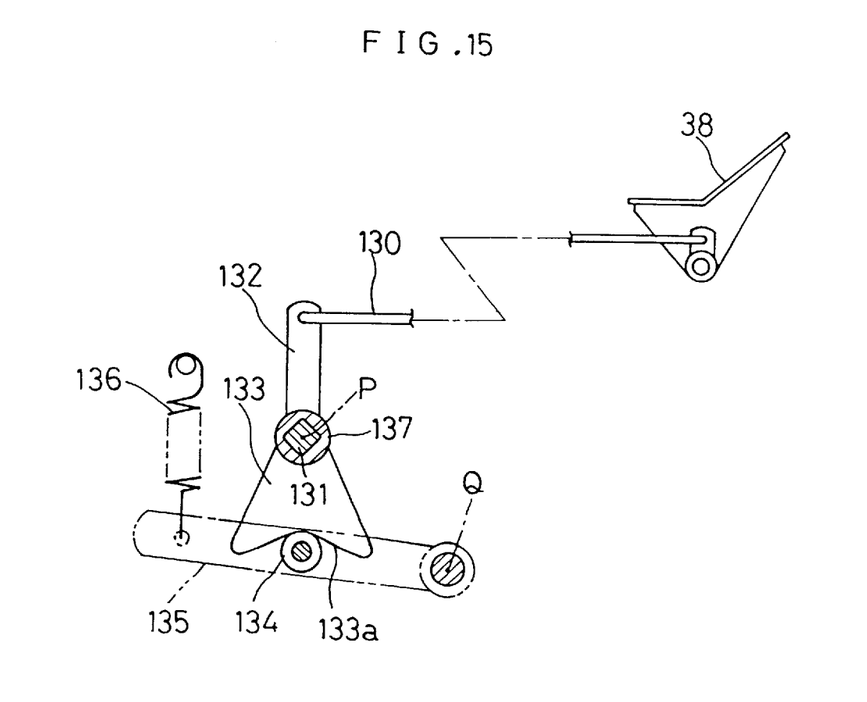
FIG. 15 is a schematic view of the shift controller.

As shown in FIG. 1, the shift pedal 38 for operating HST 6 is provided on a foot rest 128 in the driver's section 200 to be pivotable backward and forward. As shown in FIGS. 14 and 15, the shift pedal 38 is linked to a push-pull rod 130 having a forward end thereof connected to an arm 132 pivotable with a trunnion 131 about an axis P thereof, the trunnion 131 projecting from a side of HST 6. A V-shaped cam plate 133 pivotable with the arm 132 and trunnion 131 defines a V-shaped cam surface 133a for acting on a cam follower 134. The cam follower 134 is supported by a neutral maintenance arm 135 supported by the transmission case 5 to be pivotable about a horizontal axis Q. The neutral maintenance arm 135 is elastically biased by a spring 136 to bias the cam follower 134 toward the trunnion 141. With this construction, HST 6 is automatically maintained in neutral unless the shift pedal 38 is depressed.

As shown in FIG. 14, the trunnion 131 is not only supported in a cantilever fashion by the HST case 111 but also supported at an end thereof by a support bar 139 to be rotatable about axis P. The support bar 139 supports a forward end of a tubular boss 137 welded to the arm 132 and V-shaped cam plate 133 and fitted on the trunnion 131 to be rotatable therewith.

Specifically, the tubular boss 137 formed integral with the V-shaped cam 133 is passed through a bore 116c formed in the right frame 116 to extend between this frame 116 and the right main frame 112. The support bar 139 is relatively rotatably fitted in a recess 138 formed in the forward end of the tubular boss 137, and extends through an opening 112a formed in the main frame 112. The support bar 139 is welded to a mounting plate 140 fixed to the main frame 112 by bolts 141.

Thus, besides the pair of right and left main frames 112, the transmission case 5 connected to the main frames 112, and the hydraulic block 9 connected to HST 6, are also used as part of the frame structure. The driver's seat 41, rollover protection structure 124 and fenders 121 are connected to the main frames 112, hydraulic block 9 and the like through the right and left frames 115 and support frames 120 having simple constructions. This frame structure has greater durability against external loads than where only the main frames 112 form a frame structure. The entire frame structure described above has a high degree of durability even if the main frames 112 per se have low durability.

Where the present invention is applied to a four wheel drive working vehicle different from a riding lawn tractor as shown in FIG. 1, the engine 4 may be mounted in a front region of the vehicle body, and the transmission case 5 in a rear region for supporting rear wheels 2, with HST 6 connected to a forward position of the transmission case 5.

Where the transmission case 5 is mounted in the rear region of the vehicle body, the two wheel drive-four wheel drive changeover mechanism 8 may be replaced with a front wheel change speed device (not shown) disposed in the transmission case 10a as a transmission mechanism (for switching between a standard state in which the front wheels 1 are driven at the same speed as the rear wheels 2, and an accelerative state in which the front wheels 1 are driven faster than the rear wheels 2).

Although the invention has been described in its preferred form with a certain degree of particularity, it is understood that the present disclosure of the preferred form has been changed in the details of construction and the combination and arrangement of parts may be resorted to without departing from the spirit and scope of the invention as hereinafter claimed.

What is claimed is:

1. A four wheel drive working vehicle having forward drive wheels and rear drive wheels, said vehicle comprising:
    an engine;
    a transmission case;
    a hydraulic block including a side for covering said transmission case;
    an HST attached to an opposite side of said hydraulic block, said HST including:
        an input shaft for transmitting drive from said engine; and
        an output shaft positioned above said input shaft and extending through said hydraulic block;
    a shaft member disposed within said transmission case for transmitting drive from said output shaft to said forward drive wheels and said rear drive wheels, said shaft member being positioned below said output shaft;
    a drive transmission mechanism disposed between said shaft member and one of said forward drive wheels and said rear drive wheels, said drive transmission mechanism including means for engaging and disengaging the drive therebetween; and
    an intermediate shaft disposed between said shaft member and said one of said forward drive wheels and said rear drive wheels, said intermediate shaft being positioned below said shaft member and said input shaft of said HST, said intermediate shaft extending through said hydraulic block.

2. A four wheel drive working vehicle as defined in claim 1, wherein said drive transmission mechanism is disposed at a lower portion of said hydraulic block.

3. A four wheel drive working vehicle as defined in claim 1, further comprising a filter mounted to said opposite side of said hydraulic block, wherein said hydraulic block defines an oil passage for communicating pressure oil in said filter with said HST.

4. A four wheel drive working vehicle as defined in claim 3, wherein said oil passage is contained in said hydraulic block.

5. A four wheel drive working vehicle as defined in claim 1, further comprising a high/low switching change speed device, a PTO shaft, a transmission gear rotatably mounted on said PTO shaft for independent rotation thereabout, and a PTO clutch for selectively transmitting the drive to said HST and said PTO shaft.

6. A four wheel drive working vehicle as defined in claim 5, wherein said intermediate shaft is arranged to receive the drive from said transmission gear rotatable about said PTO shaft.

7. A four wheel drive working vehicle as defined in claim 1, further comprising a pair of right and left main frames extending longitudinally of a vehicle body, and a pair of frame members connected to said main frames, respectively, wherein said hydraulic block is connected to said pair of frame members through connecting means.

8. A four wheel drive working vehicle as defined in claim 7, wherein said pair of frame members include right and left surfaces opposed to each other across said hydraulic block transversely of said vehicle body, and connecting stays fixed to said right and left surfaces for contacting said hydraulic block longitudinally of said vehicle body.

9. A four wheel drive working vehicle as defined in claim 8, wherein said connecting means includes a plurality of bolts applied transversely and longitudinally of said vehicle body for fixedly connecting said hydraulic block to said frame members.

10. A four wheel drive working vehicle as defined in claim 1, wherein said drive transmission mechanism includes another transmission case and a two wheel drive-four wheel drive changeover clutch mounted within said another transmission case, said another transmission case being fixedly connected to said hydraulic block.

11. A four wheel drive working vehicle as defined in claim 10, wherein said one of said forward drive wheels and said rear drive wheels comprises said rear drive wheels, and wherein said two wheel drive-four wheel drive changeover clutch is operable to transmit the drive to said rear drive wheels through a rear wheel output shaft, said rear wheel output shaft extending rearward through said another transmission case.

* * * * *